United States Patent Office 3,316,329
Patented Apr. 25, 1967

3,316,329
FLAMEPROOF COMPOSITIONS CONTAINING COPOLYMERS OF ETHYLENE AND TRIBROMOALLYL ESTERS
George E. Waples, Jr., Lake Jackson, Tex., assignor to The Dow Chemical Company, Midland, Mich., a corporation of Delaware
No Drawing. Filed Mar. 24, 1965, Ser. No. 442,469
11 Claims. (Cl. 260—897)

This invention relates to flameproof thermoplastic materials and more particularly to novel flameproof moldable ethylene/brominated ester copolymers.

It is well-recognized that many polymeric thermoplastic materials such as polyethylene are normally flammable and because of this their use in application where fire is a hazard is limited. The art, in order to overcome this limitation, has devised numerous methods of rendering such thermoplastic materials flameproof, these methods involving the incorporation into the thermoplastic material of ingredients which render it flameproof. Very often the incorporation of these flameproofing materials adversely affects other valuable physical properties of the thermoplastic materials and thus, despite their flameproof properties, the thermoplastic materials are unsuitable for use in a number of applications requiring excellent physical properties as well as flame retardance. There is thus a need for improved fireproof thermoplastic materials and particularly those of polyethylene.

According to the present invention, fire retardant moldable thermoplastic ethylene polymers are prepared by polymerizing ethylene with a 2,3,3-tribromoallyl ester of an $\alpha,\beta$-ethylenically unsaturated mono- or polycarboxylic acid having from 3 to 8 carbon atoms per molecule.

Examples of suitable acid moieties of such esters suitable for copolymerization with ethylene are acrylic acid, methacrylic acid, crotonic acid, fumaric acid, maleic acid, itaconic acid and maleic anhydride. Examples of such esters are 2,3,3-tribromoallyl acrylate, 2,3,3-tribromoallyl methacrylate, 2,3,3-tribromoallyl crotonate, bis(2,3,3-tribromoallyl) fumarate, bis(2,3,3-tribromoallyl) maleate and bis(2,3,3-tribromoallyl) itaconate.

The esters can be prepared by known procedures such as by esterification of 2,3,3-tribromoallyl alcohol by reaction with the $\alpha$-$\beta$-ethylenically unsaturated acid, acid anhydride or acyl halide, or by transesterification with lower alcohol esters. For example, the esters can be prepared by reaction of 2,3,3-tribromoallyl alcohol with acrylic acid, methacrylic acid, crotonic acid, fumaric acid, maleic acid, maleic anhydride, etc.

The 2,3,3-tribromoallyl alcohol may be prepared by brominating 2,3-dibromoallyl alcohol at 60–70° C., and then reacting the resulting tetrabromopropanol with an aqueous 50 weight percent NaOH solution at 30–35° C. The crude 2,3,3-tribromoallyl alcohol is separated by filtering and is purified by recrystallization from a solution of toluene and naphtha. Esters of the alcohol may be prepared by the Schotten-Baumann method of synthesis wherein the alcohol and an acid chloride are reacted at low temperature in the presence of strong caustic. An alternative method is direct esterification using an acid catalyst and removal of the water by azeotropic distillation with toluene.

The fire retardant ethylene/brominated ester copolymer compositions of the present invention are obtained by reacting a major proportion of ethylene, i.e., from about 60 to 99.5 percent by weight with about 0.5 to about 40 percent by weight of the ethylenically unsaturated brominated ester. The amount of the ester copolymerized with ethylene depends upon the specific acid moiety of the ester. For example, if the acid portion of the ester is acrylic acid, fire retardant ethylene copolymers having the most desirable physical properties are obtained by reacting about 8 to about 20 percent by weight of the unsaturated brominated ester monomer with about 80 to about 92 percent by weight ethylene. If the acid moiety of the ester is maleic acid, then ethylene copolymers having the most desirable physical properties are obtained by reacting from about 2 to about 9 percent by weight of the unsaturated brominated ester monomer with about 91 to about 98 percent by weight ethylene.

The copolymers can be prepared by methods known to the art, for example, by polymerizing mixtures of ethylene and one or more of the specified unsaturated brominated esters either in tubular or autoclave reactors at pressures from about 50 to 30,000 pounds per square inch, or higher, and at temperatures from about 150° C. to about 300° C. using, at catalytically effective concentrations, free radical producing polymerization catalysts as azo catalysts like $\alpha,\alpha$-azobisisobutyronitrile and peroxygen-type catalysts such as diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborate, percarbonates, and the like. Such catalysts usually are used in the range from about 0.01 percent to about 0.10 percent, based on the weight of the monomers. Other methods of catalysis, such as irradiation by ultraviolet, X-ray and gamma rays as well as by radiation from linear accelerators, resonant transformers, and the like, may be used if desired.

It will be appreciated by those skilled in the art that various other materials can be added to the ethylene/brominated ester copolymer compositions of the present invention. For example, the addition of minor amounts, i.e., from about 5 to about 50 percent by weight of low density polyethylene to the brominated ethylene copolymers of the present invention decreases the flexibility, elongation and tackiness of the copolymer. Other materials which may be added to the copolymer include plasticizers, lubricants, dyes, pigments and inorganic flame retardants such as antimony trioxide may be present in amounts ranging from 2 to 25 percent by weight. If it is desired to add any of these materials to the ethylene copolymer of the present invention the addition can be accomplished simply by mixing the ingredients in any manner known to the art. For instance, blends of the ethylene/brominated ester copolymer with any of the aforementioned materials can be prepared by milling prior to the molding operation or may be prepared by mixing as an incident to the molding operation such as by extrusion.

The copolymers of the present invention may be molded by any of the various types of molding operations known to the art such as injection molding, compression molding, extrusion and transfer molding. They are also useful in combination with solvents to make lacquers or surface-coating materials or they may be employed in the manufacture of reinforced or unreinforced films. The copolymer resins of the present invention find ready use in applications where the resin required must be fire resistant and have high tensile properties and rigidity. Typical of such applications are building materials such as roof flashing, sealants, moldings and vapor barrier materials.

To illustrate the manner in which the invention may be carried out, the following examples are given. It is to be understood, however, that the examples are for the purpose of illustration and the invention is not to be regarded as limited to any of the specific materials or conitions recited therein. Unless otherwise stated, all percentages cited in the examples below are based on weight.

Example 1

Ethylene and 2,3,3-tribromoallyl acrylate (TBAA) were copolymerized in a series of runs identified and further described in Table I. The runs were carried out in a continuous manner in a 5-liter pressure autoclave stirred at 1200 r.p.m. at a temperature of 200° C. and a pressure of 21,000 p.s.i. The table shows the average rate of feed of ethylene and of 2,3,3-tribromoallyl acrylate in pounds per hour, as well as the concentration of the catalyst, α,α-azobisisobutyronitrile introduced in the autoclave. The amount of ester found in each product produced and the bromine content of the polymer are also shown.

Table I further shows properties of the resulting copolymer products.

Melt index measured by ATSM D–1238–57T.

Tensile and yield strength in p.s.i. and elongation in percent of original length at break are measured by ASTM D–638–58T on specimens cut using die "B" of ASTM D–412–51T pulled at 10 inches per minute.

Rigidity is by ASTM D–747–58T.

Hardness is by Shore "C" method.

Density is measured by Archimedes' displacement-bouyancy principle.

Percent ester and percent bromine in the copolymer are determined by infrared spectrophotometric analyses. The brominated ester content is based on the determination of the carbonyl group and is calculated as 2,3,3-tribromoallyl acrylate (TBAA).

"ND" in the table signifies that the value was not determined.

Example 1 was blended with minor amounts i.e. less than 50 percent, of polyethylene having a density of 0.925 and a melt index of 0.29. The properties of these blends are listed in Table II below.

For purposes of comparison a blend of the same ethylene/2,3,3-tribromoallyl acrylate copolymer reaction product with a major amount of polyethylene, i.e. greater than 50 percent by weight, was also prepared with $Sb_2O_3$ also being added. The properties of this blend is shown in Table II below, sample number 4. For purposes of further comparison a composition of polyethylene containing $Sb_2O_3$ but without the ethylene/2,3,3-tribromoallyl acrylate copolymer reaction product was also prepared; the properties of this composition are also listed in Table II below, sample number 5. Thus sample numbers 4 and 5 are controls and are not examples of the compositions of this invention.

Molded samples of the above-described blend compositions were then exposed to a propane flame to determine the flame retardance properties of the compositions.

The flame retardance properties of the compositions are also shown in Table II.

TABLE II

| Sample Number | 1 | 2 | 3 | 4 | 5 |
|---|---|---|---|---|---|
| Percent Ethylene/TBAA Copolymer Reaction Product | 75 | 71.3 | 47.5 | 23.8 | 0 |
| Percent Polyethylene | 25 | 23.7 | 47.5 | 71.2 | 95 |
| Percent $Sb_2O_3$ | 0 | 5.0 | 5.0 | 5.0 | 5.0 |
| Melt Index, dg./min | 119.6 | 63.4 | 10.5 | 1.09 | 0.27 |
| Flame retardance | (1) | (1) | (1) | (2) | (3) |

1 Melted, no flame.
2 Burned with Dripping 2.5/1.75 min.
3 Burned with Dripping 2.5/1.5 min.

TABLE I

| Run No | 1 | 2 | 3 | 4 | 5 | 6 | 7 |
|---|---|---|---|---|---|---|---|
| Ethylene Feed, lbs./hr | 25.7 | 38.2 | 38.9 | 33.0 | 41.1 | 46.2 | 50.0 |
| TBAA Feed, lbs./hr | 0.3 | 0.5 | 0.5 | 0.3 | 0.4 | 0.3 | 0.1 |
| Catalyst, lbs./100 lbs. product | 1.45 | 1.00 | 1.14 | 1.35 | 2.51 | 1.40 | 0.73 |
| Percent Brominated Ester in Copolymer calculated as TBAA | 19.3 | 11.9 | 14.0 | 17.8 | 22.9 | 12.6 | 8.6 |
| Percent Bromine in Copolymer | 5.0 | 4.0 | 5.1 | 3.6 | 5.2 | 2.9 | 2.1 |
| Melt Index, dg./min | >1,000 | >1,000 | >1,000 | 1,000 | >1,000 | 76.4 | 17.1 |
| Tensile Strength, p.s.i. | 1,535 | 1,605 | 1,550 | 1,820 | 1,960 | 1,395 | 1,265 |
| Yield Strength, p.s.i. | 1,675 | 1,915 | 1,870 | 1,955 | 1,925 | 1,905 | 1,840 |
| Elongation, percent | 30 | 40 | 45 | 15 | 20 | 80 | 95 |
| Rigidity | 2.5 | 3.4 | 3.4 | 3.3 | 3.6 | 2.9 | 2.6 |
| Hardness | 80 | 85 | 85 | 85 | ND | ND | ND |
| Density, g./cc | 0.9700 | 0.9587 | 0.9691 | 0.9770 | 0.9906 | 0.9545 | 0.9439 |

Molded samples of the ethylene/2,3,3-tribromoallyl acrylate copolymer reaction products prepared above would not support a flame after the source, a propane flame, was removed.

Example 2

Ethylene at the rate of 46.9 pounds per hour, bis(2,3,3-tribromoallyl) maleate (BTAM) at the rate of 0.06 pound per hour, and α,α-azobisisobutyronitrile at the rate of 0.20 pound per 100 pounds of product were pumped into a stirred autoclave at a pressure of 18,000 pounds per square inch at a reaction temperature of 204° C.

The product obtained thereby was a yellow-brown resinous material which had the following properties:

Percent brominated ester in co-polymer calculated as
BTAM _____ 4.0
Melt index dg./min. _____ 1.26
Tensile strength, p.s.i. _____ 1550
Yield strength, p.s.i. _____ 1775
Elongation, percent _____ 345
Rigidity _____ 2.6
Hardness _____ 85

Molded samples of the copolymer product prepared above would not support a flame after the source, a propane flame was removed.

Example 3

A copolymer prepared by reacting ethylene with 2,3,3-tribromoallyl acrylate according to run 3 of Table I of Results similar to the foregoing may also be obtained when any of the other 2,3,3-tribromoallyl esters of α-β-ethylenically unsaturated mono- and polycarboxylic acids are copolymerized with ethylene in place of the esters set forth in the above examples.

What is claimed is:

1. A moldable, thermoplastic copolymer comprised of the reaction product of ethylene and the 2,3,3-tribromoallyl ester of an acid selected from the group consisting of α,β-ethylenically unsaturated mono- and polycarboxylic acids having from 3 to 8 carbon atoms per molecule.

2. The copolymer of claim 1 wherein the acid is acrylic acid.

3. The copolymer of claim 1 wherein the acid is maleic acid.

4. The copolymer of claim 1 wherein the copolymer is obtained by reacting about 60 to about 99.5 percent by weight of ethylene with about 0.5 to about 40 percent by weight of the ester.

5. The copolymer of claim 1 wherein the copolymer is obtained by reacting about 80 to 92 percent by weight of ethylene with about 8 to about 20 percent by weight of 2,3,3-tribromoallyl acrylate.

6. The copolymer of claim 1 wherein the copolymer is obtained by reacting about 81 to about 98 percent by weight ethylene with about 2 to about 9 percent by weight of bis(2,3,3-tribromoallyl) meleate.

7. A blend composition comprising from about 50 to about 95 percent by weight of the reaction product of ethylene and the 2,3,3-tribromoallyl ester of an acid selected from the group consisting of α,β-ethylenically unsaturated mono- and polycarboxylic acids having from 3 to 8 carbon atoms per molecule, and about 5 to about 50 percent by weight of polyethylene.

8. The composition of claim 7 wherein the acid is acrylic acid.

9. The composition of claim 7 wherein the product is obtained by reacting about 60 to about 99.5 percent by weight of ethylene with about 0.5 to about 40 percent by weight of the ester.

10. The composition of claim 7 wherein the product is obtained by reacting about 80 to 92 percent by weight of ethylene with about 8 to about 20 percent by weight of 2,3,3-tribromoallyl acrylate.

11. The composition of claim 7 wherein the polyethylene is low density polyethylene.

References Cited by the Examiner
UNITED STATES PATENTS

| | | | |
|---|---|---|---|
| 2,643,991 | 6/1953 | Tawney | 260—86.7 |
| 3,132,120 | 5/1964 | Graham et al. | 260—78.5 |
| 3,210,326 | 10/1965 | Touisgnant et al. | 260—86.7 |
| 3,219,640 | 11/1965 | Lee | 260—86.7 |

MURRAY TILLMAN, *Primary Examiner.*

T. G. FIELD, JR., *Assistant Examiner.*